United States Patent [19]
Ealding

[11] 3,871,897
[45] Mar. 18, 1975

[54] FOAMED OLEFIN POLYMER WALLPAPER

[75] Inventor: Cyril John Ealding, Puckeridge, England

[73] Assignee: Imperial Chemical Industries Limited, London, England

[22] Filed: Mar. 6, 1973

[21] Appl. No.: 338,525

Related U.S. Application Data

[63] Continuation-in-part of Ser. No. 119,713, March 1, 1971, Pat. No. 3,839,238, which is a continuation-in-part of Ser. No. 724,237, April 25, 1968, abandoned.

[52] U.S. Cl.................... 117/15, 117/38, 117/98, 117/138.8 E, 260/2.5 E, 260/2.5 HA
[51] Int. Cl............................................. B32b 27/32
[58] Field of Search.......... 117/75, 38, 98, 138.8 E; 260/2.5 E, 2.5 HA

[56] References Cited
UNITED STATES PATENTS

| | | | |
|---|---|---|---|
| 3,227,784 | 1/1966 | Blades et al..................... | 260/2.5 E |
| 3,281,259 | 10/1966 | Lux et al.............................. | 117/38 |
| 3,287,477 | 11/1966 | Vesilind............................. | 264/176 |
| 3,408,218 | 10/1968 | Van Muylwijk...................... | 117/15 |
| 3,452,123 | 6/1969 | Beckmann et al. ............... | 260/2.5 E |
| 3,491,173 | 1/1970 | Kobsa........................... | 260/2.5 HA |

*Primary Examiner*—William D. Martin
*Assistant Examiner*—Sadie L. Childs
*Attorney, Agent, or Firm*—Cushman, Darby & Cushman

[57] ABSTRACT

Wallpaper consisting of an open celled foamed olefin polymer film having a thickness of 0.014 to 0.065 inch, a density of from 0.05 to 0.5 g cm$^{-3}$, an average cell diameter of from 120 to 250 $\mu$m, an air permeability of at least 0.0075 ml cm$^{-2}$ sec$^{-1}$cm head-1 mil thickness and a water vapour permeability of from 500 to 10000 g m$^{-2}$ day$^{-1}$ mil thickness.

3 Claims, 1 Drawing Figure

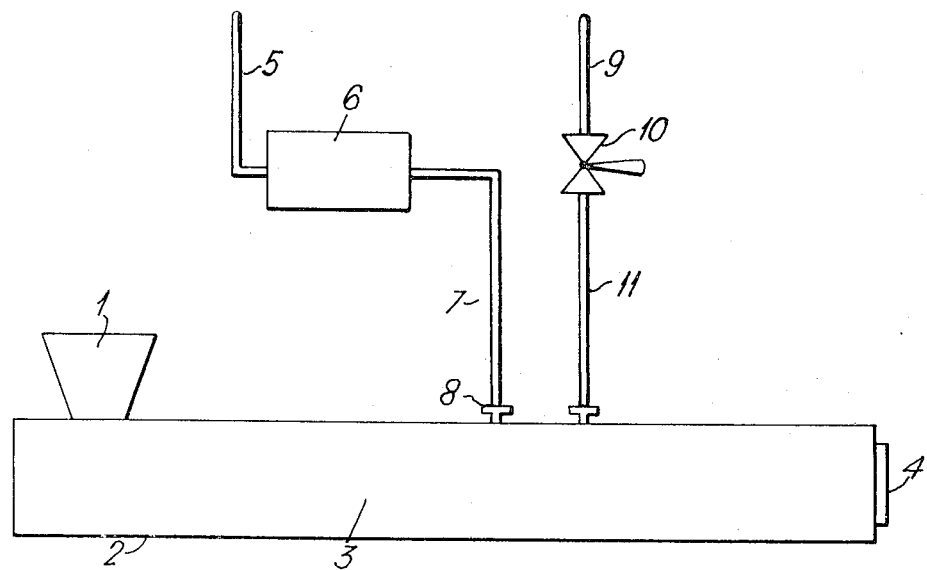

FOAMED OLEFIN POLYMER WALLPAPER

This application is a continuation-in-part of my application Ser.No. 119,713 filed 1 Mar. 1971 now U.S. Pat. No. 3,839,238, entitled "Foamed Polyolefines" which in turn was a continuation-in-part of now abondoned application Ser. No. 724,237 filed 25 Apr. 1968 entitled "Foamed Thermoplastics".

This invention relates to wallpaper. Wallpaper i.e. a paper-like material having a repeating pattern printed on one side thereof is normally hung on walls using an sdhesive paste such as a starch or cellulose based adhesive admixed with water. With conventional wallpaper based on natural cellulosic fibre one of the problems in hanging is to remove air bubbles trapped between the paper and the wall. These are liable to give rise to poor adhesion and/or unsightly bulges of the paper.

I have found that certain foamed films of olefin polymers are suitable for use as a wallpaper base and obviate this, and other disadvantages, of conventional papers.

I have found that the film should have a predominantly open cell structure i.e. at least 50% of the volume of the film comprising open cells. The volume percentage occupied by open cells, by closed cells and by the cell walls can be determined by the procedure described by Remington and Pariser in "Rubber World" May 1958 at pages 261 to 264. The films should also have an average cell diameter in the range 120 to 250 $\mu$m, an air permeability of at least 0.0075 ml of air per square cm of film per second per cm head of water pressure per reciprocal mil film thickness (i.e. 0.0075 ml cm$^{-2}$ sec$^{-1}$ cm head$^{-1}$ mil), a thickness in the range 0.014 to 0.065 in, i.e. 14 to 65 mil, a density of 0.05 to 0.5, preferably 0.1 to 0.4, g cm$^{-3}$, and a water vapour permeability of from 500 to 10000 g m$^{-2}$ day$^{-1}$ mil thickness. The air and water vapour permeabilities are measured in accordance with British Standards 2925 and 3177 respectively.

The specified air permeability enables air trapped between the film and the wall to permeate readily through the film thus avoiding bubbles while the specified water vapour permeability enables the paste used to hang the paper to dry out in a reasonable time.

Under differential pressure the films are preferably also permeable to liquids and preferably have a permeability to liquid water of at least 12 ml m$^{-2}$ min$^{-1}$ cm head$^{-1}$ mil thickness.

Since the foamed film has capillary like pores therethrough created by the open cell foam structure the permeability to water is not directly proportional to the applied water pressure but instead is proportional to the difference between the applied pressure and the pressure required to counteract the surface tension of the water. The permeability to water is measured on a circular sample 8.5 cm diameter clamped horizontally to which water from a constant head is applied. Initially all the air in the sample is removed by applying the water to the upper side of the sample and, when droplets appear on the underside, the sample is inverted. The water flow rate through the sample is measured by measuring the quantity passing through in a given time. This is done for four different heads of water, all of which are less than 50 cm and which are above the head required to counteract the surface tension (which will of course vary depending on the pore size of the foam: typical values of the head required to counteract the surface tension range from 10 to 30 cm). The volume flowing in unit time is plotted against the applied head and the permeability, $k$, calculated from the slope of the graph according to the equation $$k = V/TA \cdot 1/P\text{-}p$$

Where $V$ is the volume in ml flowing in $T$ minutes through the sample of $A$ sq metres under an applied head of water of P cm, a head of $p$ cm being required to counteract surface tension.

The permeability to water is advantageous as it enables the adhesive paste to permeate into the pores or cells of the film and hence provide a better key of the film to the adhesive.

The films having the specified thickness and density have a satisfactory "feel" for wallpaper applications.

The film is made from an olefin polymer or from a mixture of olefin polymers. Olefin polymers that may be used are homopolymers of olefins such as ethylene, propylene, butene-1 and 4-methyl pentene-1 and copolymers of two or more of such olefins. Ethylene polymers, either of the high or low density type are preferred.

In some cases suitable foamed polyethylenes may be further characterised by the presence after disintegration with fuming nitric acid of needle shaped fragments, a major proportion of which have a length of from 5 to 20 microns and a length to width ratio of at least 50 to 1 and are uniaxially oriented. The method used for the disintegration with fuming nitric acid is that described by Palmer and Cobbold in Die Makromolekulare Chemie, 1964, Vol. 14, pages 174–189. The disintegrated material is then examined by electron microscopy. Electron diffraction patterns obtained from individual needle shaped fragments are characteristic of uniaxial orientation since the patterns obtained are in the form of spots as compared to the rings obtained from randomly oriented polymer.

The foamed films may be made by an extrusion process wherein the olefin (by which term I include mixtures of olefin polymers), optionally in admixture with pigments, fillers, which may be in the form of fibres of, e.g. glass, asbestos or a thermoplastic fibre of higher melting point than the main bulk of the polymer, e.g. in the case of polyethylene, polyamide or polyester fibres, dyes and heat or light stabilisers, is fed to an extruder and is extruded at an elevated temperature from a region of high internal pressure to a region of lower pressure in the form of a film.

A blowing agent system is injected into the molten olefin polymer in the extruder and mixed therewith to form a solution. The blowing agent Ser. No. comprises from 10 to 50% by and of the olefin polymer of a first blowing agent which is completely miscible with the molten olefin polymer at the high pressure in the extruder and a second blowing agent which has a limited solubility in the olefin polymer at the elevated temperature and pressure in the extruder. The second blowing agent should have a solubility of between 0.01 and 10% by weight of the olefin polymer at the elevated temperature and pressure and is used in an amount not substantially exceeding its solubility. The first blowing agent should have a boiling point, at the pressure of the region into which the film is extruded, below the temperature at which the second blowing agent should have critical temperature below the extrusion temperature.

The amount of first blowing agent used is in excess of the amount required to cause the olefin polymer to foam and the excess of the blowing agent vaporises on extrusion thus absorbing latent heat from the olefin polymer as it emerges from the extrusion die and foams. In this way the foamed olefin polymer is set in its foamed state.

If smaller quantities of the first blowing agent are used, all the blowing agent will vaporise before the olefin polymer has solidified. This will permit the foam structure to disappear or be modified since there will be insufficient cooling of the foamed olefin polymer by the vaporising blowing agent to cause it to solidify while there is still sufficient gas pressure generated by the blowing agent system to maintain the foam structure.

I have found that the best results are obtained using 20 to 45% by weight of the first blowing agent, based on the weight of the olefin polymer.

The blowing agent system is injected into the molten olefin polymer as it passes along the barrel of the extruder through which the molten olefin polymer is passed and this is important because an excess of the first blowing agent is used which means that the mixture of the olefin polymer and the blowing agent is generally too fluid to be fed directly to the feed hopper of the extruder.

In addition, generally the olefin polymer and first blowing agent are not miscible in the cold. Consequently a mixture of the two would consist of a slurry which would not feed satisfactorily to the feed hopper. Also the first blowing agent would be liable to boil off from the feed section of the extruder, back through the feed hopper, with consequent fire risk where the first blowing agent is inflammable. as the incompletely fused olefin polymer would not exert a sufficient barrier to the passage of the vaporised blowing agent backwards through the feed section. These problems are overcome by the injection of the first blowing agent directly into the barrel of the extruder beyond the feed section i.e. into the melt of the olefin polymer. This technique allows a good control over the quantity of the blowing agent added.

The second blowing agent, which is gaseous, is also injected into the molten olefin polymer as it passes through the barrel of the extruder. Preferably the second gaseous blowing agent is injected at a different point to the first blowing agent as injecting them together would necessitate injecting a solution of the second blowing agent in the first blowing agent, in which the second blowing agent may have only a limited solubility, or else maintaining a homogeneous mixture of the two phases in the pumping lines which is difficult to ensure. Consequently the system would be less versatile.

It is sometimes necessary to provide a constriction in the extruder upstream of the point or points where the blowing agents are introduced and this may be achieved by modification of the screw or, in the case of a multiscrew extruder, the screws, of the extruder so that a build up of pressure is achieved prior to the constriction and a region of comparatively low pressure occurs after the constriction. The blowing agents are then introduced into such a low pressure region (the pressure of which may in practice be of the order of 1000 p.s.i.) which is hereinafter referred to as a "decompression zone".

Either or both blowing agents may be injected into the decompression zone by means of a metering device. In the preferred case where the first blowing agent is a liquid and the second a gas, the liquid may be injected into the decompression zone by a piston, diaphragm or other metering pump which leads to an oscillation of pressure within the decompression zone. By supplying the second gaseous blowing agent to the decompression zone through a non-return valve at a pressure within the range of pressure oscillations produced by the liquid metering pump, the supply of the blowing agent is also automatically controlled by the liquid metering pump.

The first blowing agent may be injected using a displacement pump while the second blowing agent may be injected utilising a pressure difference between a high pressure reservoir, for example a gas cylinder, of the second blowing agent and the extruder barrel. A typical system for introducing the blowing agents into olefin polymer will now be described with reference to the drawing accompanying this application. The drawing shows schematically an extruder and separate means for introducing each blowing agent into the extruder.

The olefin polymer is fed to a hopper 1 of a screw extruder 2 wherein it is melted in a feed section 3 and extruded through a die 4. The first blowing agent is fed from a supply via pipe 5 to a metering pump 6 from whence it is injected into the olefin polymer melt in the extruder barrel via pipe 7 and an injection port 8 fitted with a non-return valve. The second blowing agent is fed from a constant pressure supply via pipe 9 to a pressure regulating valve 10 from whence it passes into the molten olefin polymer via pipe 11 and an injection port 12 fitted with a non-return valve. The blowing agents are thoroughly mixed with the olefin polymer melt in a mixing section of the extruder screw between the injection ports and the die 4.

The extruder may be fitted with any suitable film forming die, although, since I have found that the best foaming is produced when the distance over which the pressure drop from the interior of the vessel to the atmosphere is as short as possible, I prefer to use a die having a short land.

The first and the second blowing agents are selected so that they are inert with respect to the olefin polymer under the pressure and temperature conditions of the pressure vessel.

The first blowing agent which is completely miscible with the olefin polymer to be foamed may be a solid, a liquid or a gas at normal temperature and pressure. It must, however, have a boiling point below the temperature at which the mixture is extruded at the pressure prevailing in the region into which the mixture is extruded (which will normally be atmospheric) so that foaming will occur at that temperature. At the same time the first blowing agent must be, as stated above, a good solvent for the olefin polymer under the conditions of pressure and temperature existing in the extruder and in practice this means that, for example, a vapour having a critical temperature below the extrusion temperature would not be suitable as the first blowing agent. In view of this and other limitations, I have found that the most suitable substances for use as the first blowing agent are liquids whose boiling points at atmospheric pressure are greater than room temperature, i.e. 20°C, and are at least 10°C below the temperature at which the mixture is extruded.

Examples of liquids which may be used as the first blowing agent in my invention include saturated hydrocarbons such as pentane, hexane, heptane, octane; unsaturated hydrocarbons such as pentene, 4-methyl pentene hexene; petroleum ether fractions; and halogenated hydrocarbons such as methylene chloride, or 1,1-,2-trichloro-1,2,2-trifluoroethane. The particular liquid chosen for a given olefin polymer is of course limited by its miscibility with the olefin polymer under the conditions in the extruder as well as by the requirement that its boiling point should be below the extrusion temperature.

In order to produce the foamed films more first blowing agent than is required to cause foaming is used and a concentration of the first blowing agent of at least 10% by weight is normally required. If a concentration of first blowing agent of more than 50% by weight is used, then the product is expensive to produce and there is a tendency for the cell walls in the foamed film to collapse so that an unsatisfactory film is obtained.

Because of the requirement that its critical temperature should be less than the temperature of the homogeneous mixture on its release from the pressure vessel, the second blowing agent is normally a gas although certain low boiling liquids may be used especially in the case of a high melting olefin polymer, It is essential that the second blowing agent should have a solubility of at least 0.01% in the olefin polymer and/or the first blowing agent under the conditions of pressure and temperature within the extruder since otherwise there will not be sufficient of the second blowing agent dissolved in the mixture to nucleate a large number of very small bubbles on emergence from the pressure vessel and nucleation may also arise from the first blowing agent with the result that a small number of very large bubbles are produced and the resultant foamed film is of little use as a wallpaper base. The particular second blowing agent used will, of course, depend upon the nature of the olefin polymer but I have found that carbon dioxide, nitrogen, hydrogen, helium and argon are examples of substances which may be used. Carbon dioxide or nitrogen are particulary suitable because of their ready availability and safety in use.

I prefer to add as much of the second gaseous blowing agent as possible but not substantially more than will exceed its solubility.

The solubility of the second, gaseous, blowing agent depends of course on the nature of the second blowing agent, the nature of the olefin polymer, the temperature and pressure in the extruder, and to some extent on the amount and nature of the first blowing agent.

In considering the solubilities of inert gases, e.g. $N_2$, in olefin polymers and hydrocarbon first blowing agents, the following considerations apply. For non-hydrocarbon first blowing agents they also act as a guide.

Above the melting point of the olefin polymer, the first blowing agent and the olefin polymer will be infinitely miscible. A given weight of first blowing agent/olefin polymer mixture will have somewhat greater solubility for the second blowing agent than that of the same weight of the olefin polymer alone, because the entropy of mixing will be increased by the presence of the low molecular weight material. (Other minor changes will occur due to the changed ratio of $CH_3$ to —$CH_2$—groups.) For example it has been found that a pressure of approximately 480 p.s.i. is necessary to keep 1% by weight of nitrogen in a mixture of equal parts by weight of low density polyethylene and pentane at 113°C, whereas 840 p.s.i. is necessary to maintain solution in a mixture of 3 parts by weight of polyethylene to one part by weight of pentane, at the same temperature.

Also the dependence of solubility on pressure depends on Henry's law at pressures sufficient to keep the first blowing agent from volatilising.

The temperature dependence on solubility is not large. Raising the temperature of the 3:1 mixture from 113°C to 157°C requires only an additional 60 p.s.i. to maintain 1% of nitrogen in solution.

Published information on such systems is meagre. Durrill and Griskey [A.I. Chem. E.J. 12. No 6. p.1147] show that at 190°C, 255 p.s.i. maintains 0.125% of nitrogen in pure polyethylene. Applying Henry's law and correcting for temperature, about 1900 p.s.i. would be necessary to maintain solution of 1% of $N_2$ in pure polyethylene at 112°C. From Lundberg, Wilk and Huyett's work [J. Appl. Phys. 31. 1131, 1960] 1500 p.s.i. will keep approximately 0.9% of $N_2$ in solution at 125.8°C. They show that in the range of interest, solubility increases with pressure, but slightly less than proportionately, and that contrary to what has been found for solvent/polymer mixtures, solubility increases with temperature. This is contrary to the usual experience of permanent gases dissolving in condensed phases.

The foregoing will enable those skilled in the art to estimate what range of solubility to expect and hence what injection pressure to use for the second blowing agent for any chosen set of temperatures and compositions.

Generally pressure limitations dictate how much of the second gaseous blowing agent may be incorporated and normally the amount of second blowing agent will be within the range 0.1 to 1.5%, preferably 0.2 to 1.0%, by weight of the olefin polymer.

It will be understood, as mentioned above, that some excess of the second blowing agent above its solubility may be added (although this is not preferred).

The film is preferably extruded through an annular die whereupon it foams. The film can then be slit into the desired wallpaper widths. If desired the film can be embossed.

The films are printed by normal wallpaper printing techniques with a repeating pattern and cut to the desired piece length. The material has a printability when measured by the Tappi Routine Control Test No. 19 represented by a K and N number of about 45.

The invention is illustrated but in no way limited by the following examples.

In the following examples a 1¼ inch diameter extruder is used, the screw of which is so designed that at the point of the barrel where the blowing agents are introduced there is a region where the pressure is comparatively low compared with that upstream of the point.

EXAMPLE 1

Polyethylene of melt flow index 0.7 (2.16 Kg, 190°C) was fed at a rate of 30 g per minute into the extruder described above. The screw of the extruder was rotated at 40 r.p.m. A reciprocating piston pump was used to introduce into the decompression zone petroleum ether of boiling point 40° to 60°C at such a rate that 44% by weight of the polyethylene was introduced. Carbon dioxide was also supplied to the decompression zone through a non-return valve at a pressure of 500 p.s.i. The resultant homogeneous mixture was extruded from an annular die at a temperature of 107°C and foaming occurred at the die lips. The pressure drop across the die lips which had a land length of about 0.01 inch was 100 p.s.i. To avoid creasing of the foamed extrudate this was blown into a bubble 2½ inch diameter using a pressure of 0.5 inch mercury which was collapsed and hauled off by rotating nip rollers.

The resultant product had a density of 0.12 g/cc and had a satin-like texture. Its thickness was 0.027 inch and the percentage of closed cells as estimated by the procedure described by Remington and Pariser in Rubber World, May 1958, pages 261 to 264 was 44%. The average cell diameter as determined by microscopy was 120 microns. The tensile strength at break of the material was 250 p.s.i. in the direction of extrusion and 100 p.s.i. in the transverse direction. The tensile modulus was 5000 p.s.i. in the direction of extrusion and 1300 p.s.i. in the transverse direction.

EXAMPLE 2

Polyethylene of melt flow index 0.7 was fed to the same extruder as in Example 1 at a rate of 53 g per minute, the extruder screw being rotated at 70 rpm. Petroleum ether of boiling point 60° to 80°C was pumped into the decompression zone at a rate such that 31% by weight on the polymer was introduced and using the same system of injection as before, carbon dioxide was introduced at a pressure of 500 p.s.i. An annular die of the same dimensions as in Example 1 was used, the pressure drop across the die being 100 p.s.i. and the die temperature 100°C. The inflation pressure of the bubble was 0.75 inch mercury and the bubble diameter 5 ¼ inches.

The resultant extruded tubular foamed film had a density of 0.42 g/cc, a thickness of 0.0065 inch and the percentage of closed cells was 20%. The tensile strength at break of the material was 540 p.s.i. in the direction of extrusion and 580 p.s.i. in the transverse direction, and the tensile modulus was 7100 p.s.i. in the direction of extrusion and 4000 p.s.i. in the transverse direction.

EXAMPLE 3

Polyethylene of melt flow index 0.7 was fed to the same extruder as that used in Example 1 at a rate of 60 gm/min, the extruder screw being rotated at 90 rpm. Petroleum ether of boiling point 40° to 60°C was pumped into the decompression zone at a rate such that 33% by weight of the polymer was introduced and nitrogen was also introduced at such a pressure that 1% by weight of the polymer of nitrogen was present. The foamed material was extruded at a temperature of 106°C through semi-radial die lip 0.75 inch in diameter. The pressure drop across the die was 275 p.s.i. and the lay flat tubing produced had a width of 1.5 inch and was hauled off at a rate of 12 ft/min.

The resultant foamed film had a density of 0.35 g/cc, a thickness of 0.024 inch and the percentage of closed and open cells it contained was respectively 12 and 50%. It had an average cell diameter of from 150 to 200 microns and the tensile strength at break of the material in the direction of extrusion and in the transverse direction was respectively 440 and 280 p.s.i. The water permeability of the material varied between 14.4 and 65 ml m$^{-2}$ min$^{-1}$ cm head$^{-1}$ mil thickness and its permeability to air was 0.0173 ml cm$^{-2}$ sec$^{-1}$ cm head$^{-1}$ mil thickness.

EXAMPLE 4

Polyethylene of melt flow index 0.7 containing 5% by weight of titanium dioxide was fed to the same extruder as that used in Example 1 at a rate of 89 g/min, the extruder screw being rotated at 130 rpm. The concentration of the first blowing agent, which was petroleum ether of boiling point 40° to 60°C, was 32% by weight of the polyethylene and that of the second blowing agent, which was nitrogen, was 1.25% by weight. The material was extruded through a 6 inch diameter annular die at a temperature of 107°C and the pressure drop across the die was 550 p.s.i.

The foamed film was produced at a density of 0.162 g/cc, was of thickness 0.014 inch and had an average cell diameter of about 220 microns. The tensile strength at break was 310 p.s.i. in the extrusion direction and 120 p.s.i. in the transverse direction. The tear strength of this material was measured by the Elmendorf method and found to be 2.8 g/thou in the extrusion direction and 4.5 g/thou in the transverse direction. The stiffness of the film was measured by recording the force required to bend a sample of the film at a position 1 cm away from the point where it was held by a clamp and found to be 2.6 g cm in the extrusion direction and 0.5 g cm in the transverse direction. The material contained 70% of open cells and 12% of closed cells and the co-efficient of friction between two sheets of the material was 0.5 Its surface resistivity was high being greater than $1.2 \times 10^{15}$ ohms/sq. The material had a Printing Opacity of 85%, a brightness relative to magnesium carbonate standard of 93% and a Gloss of 64%. When subjected to the IGT printability test, the product showed no signs of "picking" when tested at printing speeds of up to 620 ft/min using a standard low viscosity testing oil. The air porosity of the material was 0.28 ml cm$^{-2}$ sec$^{-1}$ cm head$^{-1}$ mil thickness.

EXAMPLE 5

The conditions of Example 4 were repeated except that 0.9% of an antistatic agent comprising the condensation product of one mole of tallow amine with two moles of ethylene oxide was added to the polymer in the extruder.

The resultant product had properties similar to those of the product produced from Example 4 with the exception that its surface resistivity was $1.2 \times 10^{11}$ ohms/sq.

EXAMPLE 6

The process and conditions of Example 4 were repeated except that in this case 10% titanium dioxide filler was mixed with the polymer prior to extrusion.

The resulting product was similar in its properties to that produced in Example 4 with the exception that its printing opacity was 90%.

EXAMPLE 7

Polyethylene containing 5% of titanium dioxide of melt flow index 0.7 was fed to the same type of extruder as that used in Example 1 at a rate of 98 g/min, the extruder screw being rotated at 130 rpm. The first blowing agent was petroleum ether of boiling point 40° to 60°C (33% by weight on the polymer) and the second blowing agent was nitrogen (1% by weight on the polymer). A 6 inch diameter die was used and the pressure drop across the die was 450 p.s.i., the extrusion temperature being 106°C. The product produced was of density 0.135 g/cc and of thickness 0.018 inch and its average cell diameter was about 250 microns, the material containing 7% closed cells and 78% open cells. The tensile strength in the extrusion direction and the transverse direction was respectively 215 and 95 p.s.i. and the tear strengths in these directions were respectively 2.17 g/mil and 3.50 g/mil. The stiffness was 4.3 g cm in the extrusion direction and 1.9 g cm in the transverse direction and the co-efficient of friction between two sheets of the material was 0.52. The printing opacity of the product was 84%. The Brightness relative to a magnesium carbonate was 91% and the product showed no signs of "picking" when tested at printing speeds of up to 620 ft/min on the IGT printability tester using a standard low viscosity testing oil. The air permeability of the product was 0.54 ml cm$^{-2}$ sec$^{-1}$ cm head$^{-1}$ mil thickness, and the water vapour permeability was 6500 g m$^{-2}$ day$^{-1}$ mil thickness.

Cell Size and Cell Wall Thicknesses

These dimensions were measured by microscopy, in the case of the cell wall thicknesses using a Baker interference microscope.

IGT Pick Resistance

This test is carried out by means of an IGT Pick Tester in which a strip of the material to be tested is affixed to a sector of a cylinder which is mounted in circumferential contact with an inking roll containing a standard testing oil which may be of low, medium or high viscosity so that when the sector is rotated the inking roll is also caused to rotate. In operation the sector is accelerated from rest in a controlled way so that the speed of any part of the sector (and so of the strip attached thereto) as it makes contact with the inking roller is known. The strip is then removed from the sector, the point at which the testing oil coverage begins to become patchy observed and the corresponding speed of the sector at that point noted. This is the IGT pick resistance. The point on the strip at which the strip surface is itself ruptured may also be noted.

K and N Ink No.

This test is a measure of ink absorbency. Excess ink is applied to the sample to be measured and left for two minutes after which time the ink which is still excess is wiped off the sample. The amount of light reflected from a standard source from this sample into a light measuring instrument is measured and compared with the light reflection from an untreated sample of the same material. The measuring source is adjusted to give a reading of 100 units with the untreated sample and the K and N No. is the number of units by which the reading obtained from the treated sample falls short of 100.

Gloss

This is a measure of the light reflecting properties of a surface. Reflected light is polarised in one direction but diffused light is not. The total amount of light emanating from a standard source which is reflected and diffused from the surface of the sample being measured is thus first measured by a light measuring instrument and adjustment made so that a reading of 100 units is thereby obtained from this instrument. A polariser is then inserted between the surface of the sample and the measuring instrument so that the reflected light is removed. The difference between the reading now obtained and 100 units is the gloss.

Brightness

The total light reflected by the sample is compared with that reflected from a standard sample of magnesium oxide and the result expressed as a percentage.

Printing Opacity

Light is shone from a standard source onto 10 thicknesses of the sample to be measured which are backed by an opaque material. The total light reflected from the sample is measured by a light measuring instrument and the reading adjusted to 100 units. The procedure is then repeated using one thickness only of the sample and the reading obtained is the measure of opacity.

Wallpaper made by printing a repeating pattern on one side of the films of Examples 1 to 7 could easily be hung on walls using a conventional wallpaper adhesive.

I claim:

1. Wallpaper comprising a foamed film of at least one olefin polymer selected from homopolymers of ethylene, propylene, butene-1 and 4-methyl pentene-1, and copolymers of at least two olefins selected from ethylene, propylene, butene-1 and 4-methyl pentene-1, having a printed repeating pattern on one side thereof, said film having
    i. a thickness of from 0.014 to 0.065 in,
    ii. a density of from 0.05 to 0.5 g cm$^{-3}$,
    iii. an average cell diameter of from 120 to 250 $\mu$m,
    iv. an air permeability of at least 0.0075 ml cm$^{-2}$ sec$^{-1}$ cm head$^{-1}$ mil thickness,
    v. a water vapour permeability of from 500 to 10000 g m$^{-2}$ day$^{-1}$ mil thickness, and
    vi. at least 50% of the volume of the film comprising open cells.

2. Wallpaper as claimed in claim 1 wherein the film has a water permeability of at least 12 ml m$^{-2}$ min$^{-1}$ cm head$^{-1}$ mil thickness.

3. Wallpaper as claimed in claim 1 wherein the film has a density of from 0.1 to 0.4 g cm$^{-3}$.

* * * * *